MATTESON & WILLIAMSON.
Cultivator-Teeth.
No 63,647.
Patented Apr. 9, 1867.
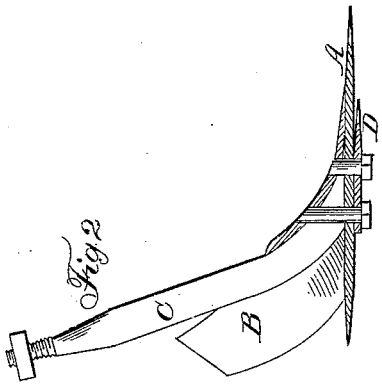
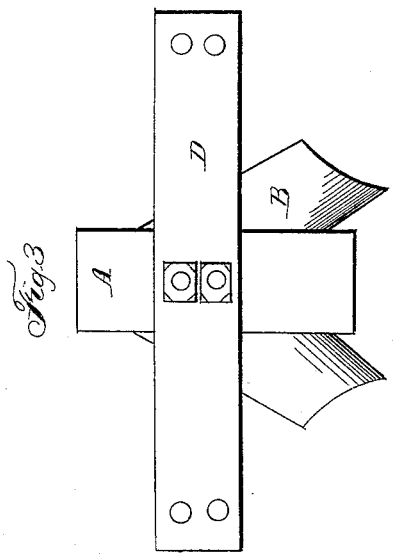
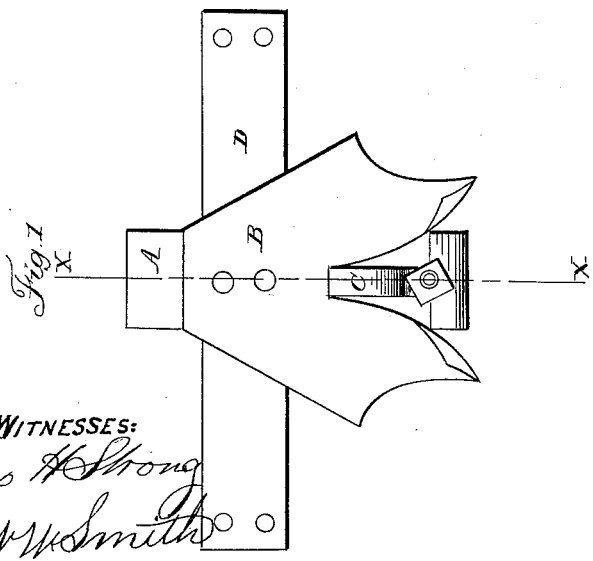
WITNESSES:
Geo H Strong
C W W Smith
INVENTOR:
D C Matteson
Y P Williamson
Dewey & Co
Attorneys

United States Patent Office.

DON C. MATTESON AND TRUMAN P. WILLIAMSON, OF STOCKTON, CALIFORNIA.

*Letters Patent No. 63,647, dated April 9, 1867.*

IMPROVEMENT IN CULTIVATOR TEETH.

*The Schedule referred to in these Letters Patent and making part of the same.*

TO ALL WHOM IT MAY CONCERN:

Be it known that we, DON C. MATTESON and TRUMAN P. WILLIAMSON, of Stockton, San Joaquin county, State of California, have invented certain new and useful Improvements in "Cultivator Teeth;" and we do hereby declare the following description and accompanying drawings are sufficient to enable any person skilled in the art or science to which it most nearly appertains to make and use our said invention without further invention or experiment.

The nature of our invention consists in providing a "cultivator tooth" having a double-pointed bit so constructed that when the bevel wears from the bottom of the point it can be turned over, thus sharpening itself, it being attached to a standard, over which and the bit is placed a double mould-board or shovel, the whole held together by bolts passing through them and the share placed transversely at the bottom. The bit can also be turned around, and the other end used when the first is worn out.

In order to more fully describe our invention reference is had to the accompanying drawings and letters marked thereon, in which—

Figure 1 represents a plan or top view.

Figure 2, a sectional elevation, taken through the line $x\,x$, fig. 1.

Figure 3, bottom view.

Similar letters indicate like parts in each of the figures.

A is a flat bit, made with double points bevelled correspondingly. Over this bit is placed a double mould-board or shovel, B, allowing the bit to project one or two inches, more or less, from it. Upon the bit rests the foot of the standard C, curved and bevelled so as to fit between the shovel and bit, the upright end or shank of which has a thread and nut with which to attach it to the cultivator frame. An oblong blade or share, D, is placed transversely across the bottom of the bit, and the edges of the double mould-board rest upon it. This share can also be changed so that either edge may be used alternately, or turned over like the bit, so as to sharpen itself. In this position the whole are fastened together by bolts passing through the mould-board, standard, bit and blade, or share. The teeth when attached to the cultivator frame will hang at an angle so that they may enter the ground to the desired depth, which is regulated by gauge-wheels attached to the frame.

By this arrangement and construction of cultivator teeth a mechanism is had that will be found admirably adapted for preparing the soil of the Pacific coast for seeding after ploughing, it being the usual custom to fallow by cultivator after the land has remained unseeded for a season; or it may be used to prepare new ground in its hardest state, the mould-board not thus being necessary; and by the use of our cultivator the necessity of ploughing again is obviated, as the arrangement of shares, points, and double mould-board completely destroys the weeds, and cultivates the spaces designed by the width of the frame.

Having thus described our invention, what we claim, and desire to secure by Letters Patent, is—

1. The double-pointed adjustable bit A, and the bevelled foot of the curved standard C, resting on the said bit, in combination with the double mould-board or shovel B, the same fitting over the standard and bit, substantially as described for the purpose specified.

2. The oblong blade or share D, in combination with the manner of fastening the teeth together by bolts passing through the mould-board, bit, and share, substantially as described.

In witness whereof we have hereunto set our hands and seals.

DON C. MATTESON. [L. S.]
TRUMAN P. WILLIAMSON. [L. S.]

Witnesses:
P. H. ROST,
B. H. BROWN,
A. G. BROWN.